United States Patent [19]

Boudet et al.

[11] 4,074,890
[45] Feb. 21, 1978

[54] MULTI-STAGE HYDRAULIC STRETCHER FOR ELONGATED FASTENERS

[75] Inventors: Georges Boudet, Saint-Cyr-sur-Loire; Jacques Charpentier, Tours; René Vinel, Bourg-la-Reine; Jean-Claude Desmoulins, Conflans-Sainte-Honorine; Emmanuel de Blic, Tours, all of France

[73] Assignee: SKF Compagnie d'Applications Mecaniques, Clamart, France

[21] Appl. No.: 735,780

[22] Filed: Oct. 26, 1976

[30] Foreign Application Priority Data

Oct. 27, 1975 France .............................. 75 32764

[51] Int. Cl.² ............................................. E21B 19/00
[52] U.S. Cl. .................................................. 254/29 A
[58] Field of Search ..................... 254/29 A; 29/452; 292/256.73; 81/57.38

[56] References Cited

U.S. PATENT DOCUMENTS

| 3,279,755 | 10/1966 | Notenboom et al. | 254/93 R |
| 3,830,536 | 8/1974 | Frisch et al. | 292/256.73 |

FOREIGN PATENT DOCUMENTS

| 1,271,050 | 6/1968 | Germany | 254/29 A |

Primary Examiner—Robert C. Watson
Attorney, Agent, or Firm—Brisebois & Kruger

[57] ABSTRACT

Hydraulic device for exerting a pre-stressing traction on bolts or pins comprises three stages, with each stage comprising a piston within a chamber. The thickness of the skirts of the piston increases from stage to stage in proportion to the pressure to which the piston of that stage is subjected during a stretching operation.

6 Claims, 3 Drawing Figures

MULTI-STAGE HYDRAULIC STRETCHER FOR ELONGATED FASTENERS

SUMMARY OF THE INVENTION

This invention relates to a hydraulic device for exerting traction on bolts or pins in order to pre-stress them and permit a nut to be screwed onto them when in that condition.

Hydraulic devices are already known for pre-stressing bolts or pins. These devices usually comprise a piston provided with a central bore through which the rod of the bolt or pin passes, while the end of this rod which projects on the side of the nut to be screwed thereon is gripped by a traction member which may, for example, be screwed onto the threaded end of the bolt. This piston generally has a bottom part serving as a guide skirt and an upper part of larger diameter, the two parts being separated by a shoulder. A body or chamber also provided with a shoulder corresponding to the first mentioned shoulder surrounds the piston and its skirt over substantially its entire length, means being provided to introduce a fluid under high pressure, for example oil, at the level of said shoulder so as to cause relative displacement of the piston inside the chamber, said displacement causing the bolt or pin to be placed under tension by the traction member. In this position it is then easy to screw the nut on, either manually or automatically, without applying substantial force.

When it is desired to subject the bolt or pins to a substantial amount of pre-stressing, one approach would be to increase the effective surface area of the piston so as to increase the total pressure which it is possible to obtain. However, such an increase is rapidly limited by considerations relative to the maximum bulk of the stretching device.

When it is desired to apply even greater pre-stress, especially in the nuclear industry where it is necessary to place a large number of bolts or pins under substantial pre-stress in order to insure the closure of covers for reactor vessels, it has been the practice to superpose in a single hydraulic stretcher several stages, each comprising a piston and chamber of analogous shape. The pressures of each stage are added to the others so that a multiplication of the pressure is theoretically obtained.

In practice it is, however, found that the yield of such hydraulic devices decreases rapidly when the pressure used is increased and the number of superposed stages is increased so that one does not in fact obtain the total pressure which one would have a right to expect by multiplying the individual pressures of each stage by the number of stages.

Applicants have found that these disadvantages may be considerably diminished by providing a particular shape for the superposed stages in a bolt stretcher of this type.

It is therefore an object of the present invention to provide a hydraulic device for pre-stressing bolts or pins having several stages in which the deformation of the various components of each of said stages are substantially equal.

The invention is also intended to provide an assembly of several hydraulic stretchers permitting the simultaneous pre-stressing of a plurality of pins or bolts as well as the easy and simultaneous handling of this assembly.

The hydraulic stretcher for pre-stressed bolts or pins according to the invention comprises several superposed stages, each of which comprises a piston provided with a central bore through which the rod of the bolt or pin passes and which has a lower part serving as a guide skirt and an upper part having a larger diameter forming a piston. Each stage also comprises a chamber provided with a shoulder and surrounding the piston and its skirt. Means are provided to introduce a fluid under high pressure at the level of the shoulder and the upper stage cooperates with a traction member attached to the end of the bolt or pin about the nut thereon. In accordance with the invention the thickness of the skirts of the pistons increases from the lowermost to the uppermost stage.

While the invention may be applied most frequently to the case in which the device comprises only two superposed stages it is most valuable when the number of superposed stages is at least three. The skirt of the lower stage is not subjected to any axial compression and it will therefore be appreciated that it serves only as a guide means so that its thickness may be freely selected and depends primarily upon economic considerations. The essential point of the invention thus resides in the particular choices of the differences in thickness of the skirts of the pistons above the lowermost piston.

In a preferred embodiment the thickness of a portion of each chamber encircling the upper part of each piston increases from the lowermost stage to the uppermost stage.

In an equally preferred embodiment the clearance between the upper part of each piston (having the largest diameter) and the corresponding part of each chamber increases from the lowermost stage to the uppermost stage.

The inlet ducts for the fluid under pressure are advantageously pierced through the chamber walls and the supply circuit is preferably so arranged as to supply each stage in series, beginning with the lowermost stage and ending with the uppermost stage, which has an air outlet.

In a particularly advantageous embodiment adapted to the case in which several stretchers for identical bolts or pins are positioned side by side in immediate proximity to each other, each chamber also comprises two external lateral surfaces which are substantially flat and diametrically opposed. In this manner the bulk of each stretching device is considerably reduced in a lateral direction.

The device will be better understood from a study of the following detailed description of two embodiments of the invention, given purely by way of illustration and example, and shown on the accompanying drawings, in which:

FIG. 3 is a partial top plan view of an assembly of hydraulic devices for stretching pins analogous to the one illustrated on FIG. 1 and also showing the section line along which FIG. 1 is taken.

Figure 1:
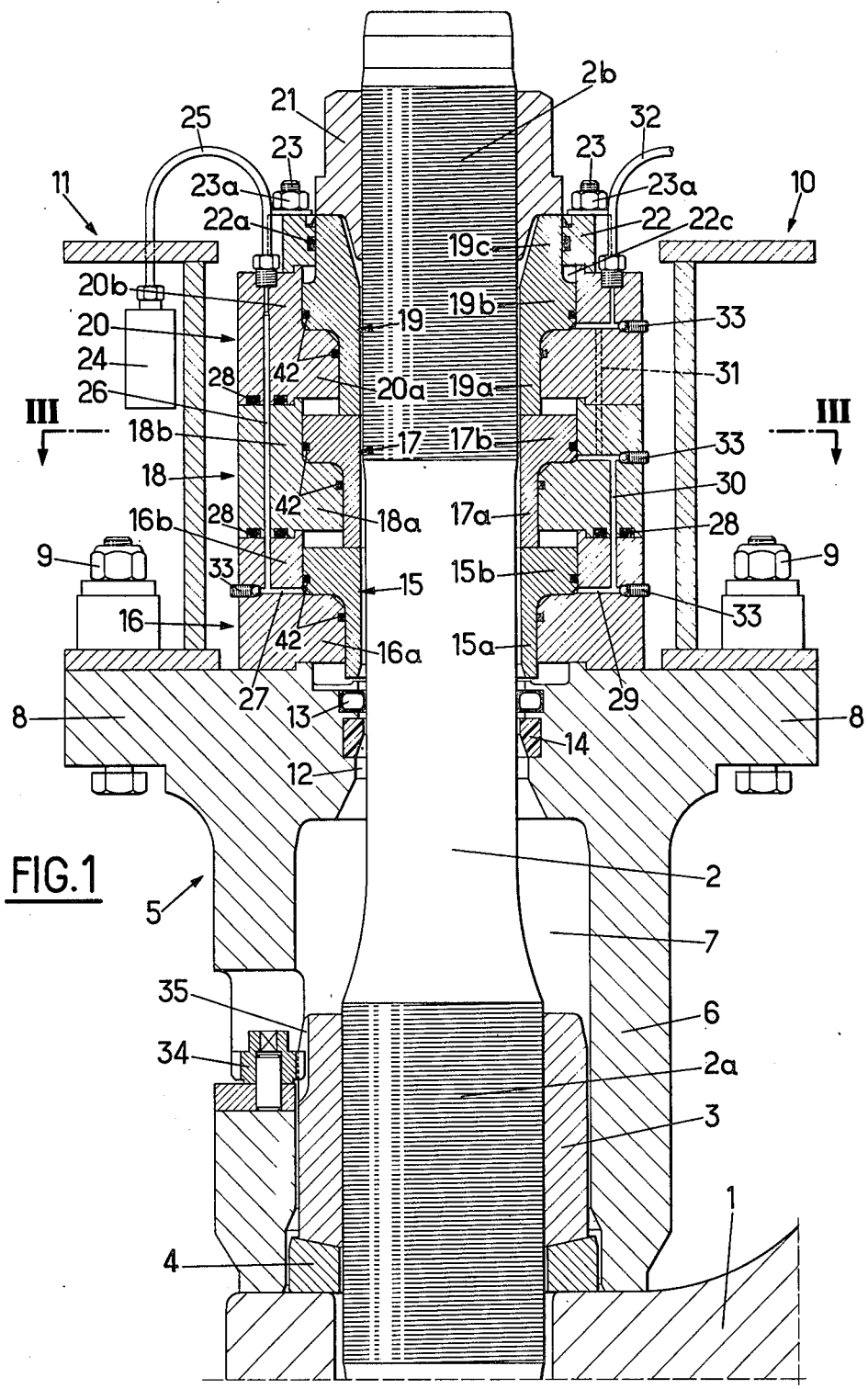
FIG. 1 is a sectional view taken along the line I-I of FIG. 3 through a stretching device for pins which forms part of an assembly of similar devices adapted to pre-stress the pins which attach its cover to a nuclear reactor vessel.

On FIG. 1, the cover 1, which is only partially shown, is attached to a nuclear reactor vessel (not shown) by means of a plurality of pins, one of which, indicated by reference numeral 2, is shown on FIG. 1. The pin 2, has one end (not shown) which is threaded, and screwed into the wall of the reactor vessel. The other end, which is shown on FIG. 1, extends outside the cover 1 and has a first threaded part 2a cooperating with a nut 3 which bears, through a washer 4 having a spherical surface, on the upper surface of the cover 1. Above the threaded part 2a extends an unthreaded portion, followed by a second threaded part 2b on which the hydraulic device according to the invention may act, as will be hereinafter seen.

A supporting member 5 the lower part of which forms a skirt 6 defines an axial cavity 7 encircling the pin 2 and bears directly on the cover 1. The cavity 7 is large enough to receive the nut 3. The upper part of the member 5 comprises a horizontal plate 8 equipped with two lateral ears (see FIG. 3). A circular internal ring 10 and a circular external ring 11 are attached to these ears by means of bolts 9. The bolts 9 are freely mounted in the lateral ears of the plate 8 to permit easy centering of each stretcher on its pin when the assembly is mounted on the cover of the vessel. Each of the rings 10 and 11 has a substantially C-shaped section and is made of several distinct components, 10a, 10b, 11a, 11b, assembled together by pivot means 10c, 11c as may be seen on FIG. 3. The girders 10 and 11 are connected to each other by cross members 10d which render the assembly rigid.

Referring again to FIG. 1, it will be seen that the pin 2 passes through a central bore 12 in the horizontal plate 8 while an inflatable sealing member 13 makes it possible to prevent any leakage of oil and a ring 14 of deformable material, for example, an elastomer, makes it possible to avoid any deterioration of the threads 2b during the introduction of the member 5 from above the pin 2.

The hydraulic pin stretcher according to the invention is positioned, as may be seen from FIG. 1, between the circular rings 10 and 11, and bears on the upper surface of the plate 8 of the supporting member 5 which itself bears on the cover 1. In the preferred embodiment illustrated on FIG. 1 the stretching device comprises three superposed stages. The lowermost stage comprises a piston 15 and a chamber 16 encircling the piston 15. In like manner the intermediate stage comprises a piston 17 and a chamber 18, and the uppermost stage comprises a piston 19 and a chamber 20.

Each of the three stages has a comparable overall structure.

Thus each of the three pistons 15, 17 and 19 is provided with a central bore through which the rod of the pin 2 passes. This bore has a diameter large enough to permit the passage of the threaded part 2b. Each of the pistons has a lower part 15a, 17a and 19a which forms a guide skirt, and an upper part 15b, 17b and 19b, having a greater external diameter than that of the corresponding skirt, forming the piston proper, and separated from the skirt by a flat horizontal shoulder. As may be seen, the height of the skirts 15a, 17a and 19a is greater than the height of the different upper parts respectively forming the pistons 15b, 17b and 19b. This results in more accurate guiding in the course of operation. The ratio between the guide length and the guide diameter is quite advantageous.

The piston of the upper stage also comprises an extreme upper portion 19c having an external diameter intermediate between that of the skirt 19a and that of the upper part forming the piston head 19b and provided with a conical internal bore adapted to receive a mating reinforcing extension of a traction nut 21 which bears against the upper piston 19 and is screwed onto the threads 2b.

Each of the chambers of the different stages consists of a lower part 16a, 18a, 20a, having a smaller internal diameter cooperating with the respective skirts of the corresponding pistons and an upper part of larger internal diameter 16b, 18b, 20b cooperating with the heads of the respective pistons. The two parts of each of these chambers are connected by a flat shoulder. A space is left free above the lowermost piston 15 and the intermediate piston 17 in order to permit upward displacement of these pistons with respect to the chambers. In like manner, a space is left free between the uppermost part 19b of the uppermost piston 19 and the lower surface of a sealed cover 22 provided with sealing rings 22a and mounted above the uppermost chamber 20.

The sealing rings 22a are positioned between the pistons and the chambers of each stage in order to insulate said flat shoulder. The assembly comprising the three chambers 16, 18 and 20 encircling the piston as well as the cover 21 is mounted on the supporting member 5 by means of four bolts 23 (see also FIG. 3) cooperating with three nuts 23a. Two of the bolts may be used to lift the assembly of stretchers during handling.

Figure 3:
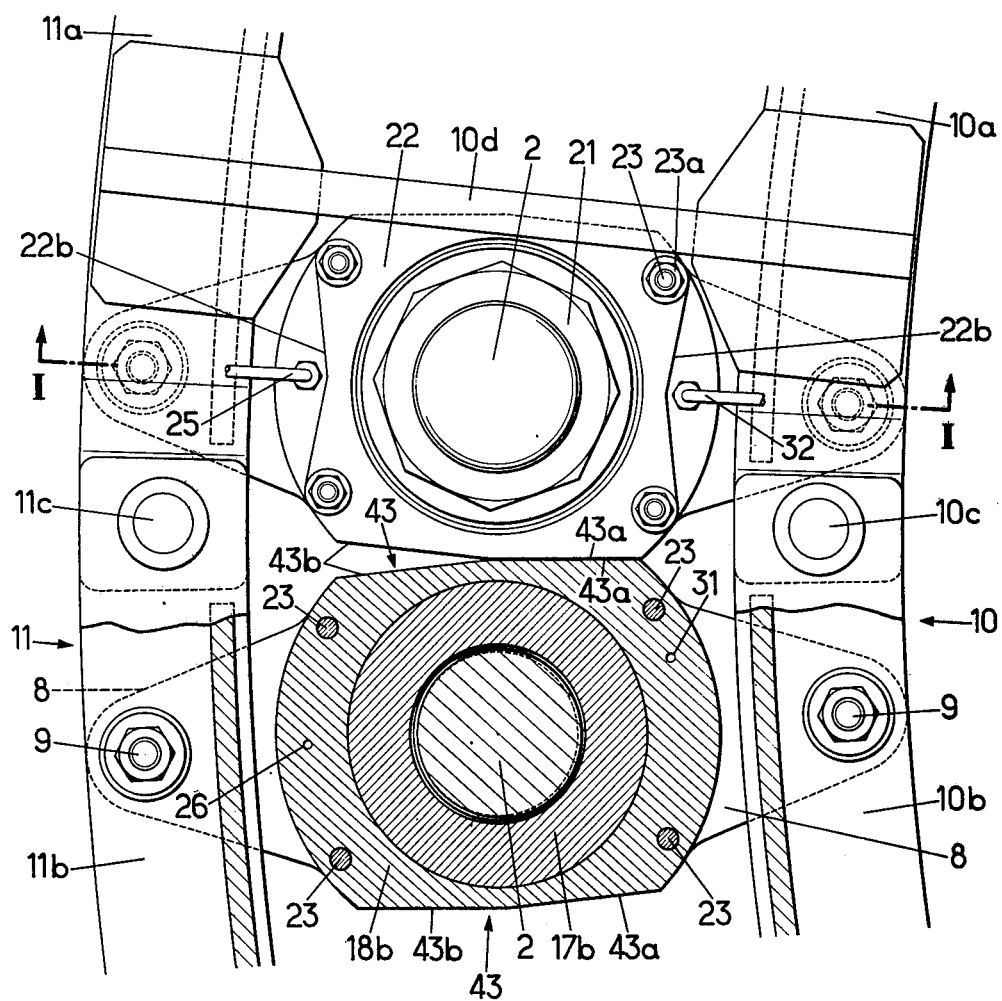

As may be seen on FIG. 3 the nuts 23a are positioned at the extreme corners of the cover 22, which has a polygonal shape and is provided with concave parts 22b permitting the passage of ducts for fluid under pressure.

A distributor for oil under high pressure 24 visible on FIG. 1 is connected by a duct 25 to a duct 26 positioned vertically and passing successively through the walls of the upper chamber 20 and the intermediate chamber 18 into the lower chamber 16. This has a radial duct 27 which opens at the level of an annular champfer delimiting the shoulder of the lower piston 15. Annular sealing members 28 encircle the duct 26 where it passes from one chamber to another.

The hydraulic circuit also comprises a radial duct 29 connecting the shoulder of the lower piston 15 with the shoulder of the intermediate piston 17 via a vertical duct 30 formed inside the walls of the chambers 16 and 18. The pressure of the hydraulic fluid is then transmitted from the shoulder of the intermediate piston 17 to the shoulder of the upper piston 18 by means of a vertical duct 31 passing through the walls of the intermediate and upper chambers 18 and 20. An air outlet 32 is connected to the hydraulic circuit at the upper part of the upper chamber 20. Ball bearing devices 33 seal the radial ducts of the hydraulic circuit.

In the example illustrated on the drawings, a plurality of pin stretching devices is simultaneously carried on the girders 10 and 11. In the application of such a device to a nuclear reactor vessel the pins are very close to each other and the invention decreases the lateral bulk of the chambers by forming on each of them two diametrically opposed flat surfaces. As may be seen on FIG. 3 the chambers comprise two lateral surfaces 43 which are substantially flat and consist for example of two flat portions 43a and 43b. The innermost flat portions 43a of the chambers of two adjacent stretching devices are then in contact as can be seen on FIG. 3, thus substantially reducing the bulk of the assembly.

As may be seen on FIG. 1, in which the proportions of the various pistons have been exaggerated, the thickness of the skirt 15a of the lower piston 15 is less than the thickness of the skirt 17a of the intermediate piston 17. The latter is itself less than the thickness of the skirt 19a of the uppermost piston 19. Applicants have in effect found that, in order to increase the hydraulic output of the pin or bolt stretcher, it is essential to equalize to a maximum the deformations of the various pistons especially at the level of their skirts, which have a tendency to yield in the direction of the axis of the pin. However, it has been found that the lowermost piston 15 is subjected to very little compressive force in an axial direction, but only to pressure exerted in a radial direction by the hydraulic fluid under pressure. The intermediate piston 17 is, on the contrary, subjected at the level of its skirt 17a, that is to say of its part of least thickness, on the one hand to a compressive force due to the action of the lowermost piston 15 and on the other hand to a radial pressure from the hydraulic fluid under pressure. The combination of these two forces results in a tendency of the skirt 17a to yield inwardly. The skirt 19a of the uppermost piston 19 is subjected to vertical compression which is even more substantial due to the combined action of the lowermost piston 15 and the intermediate piston 17. Moreover, it is subjected radially to the same fluid pressure as the skirts of the other two pistons.

Applicants have discovered that it is possible to substantially equalize the deformations of the skirts of the three pistons by providing that their thickness increases from the lowermost stage to the uppermost stage, even if this arrangement leads inevitably to an increase in the compressive force on the uppermost and intermediate pistons, since the forces of each of these stages increases from the uppermost stage to the lowermost stage when one provides such a difference in the hydraulic pressure sections.

In the preferred embodiment illustrated on the drawings in which the device has three superposed stages, the thickness of the skirt of the uppermost stage is thus greater than the thickness of the skirt of the intermediate stage.

The skirt of the lowermost stage serves only as a guide. Its thickness may be selected in any suitable manner. In the example illustrated this thickness is less than that of the other skirts in order to save material. The device according to the invention operates in the following manner:

In order to pre-stress the pins 2 the assembly of pin stretching devices attached to each other by the circular girders 10 and 11 is positioned above pins 2 which are located, in the example under consideration, at the periphery of the cover 1. The assembly supported, for example by slings, is progressively lowered so that the projecting end of each pin 2 comprising the threads 2b penetrates into the chamber 7, passes through the bore 12, and the sealing ring 14, through the different axial bores of the inner pistons 15, intermediate pistons 17 and upper piston 19 until the supporting skirt 6 bears on the cover 1.

The tension nut which is carried on the extreme upper part 19c of the upper piston 19 is then screwed on. Of course, other attaching means than the traction screw, which may be replaced by any mechanical equivalent, can be envisaged.

After inflating the sealing member 13 the device is supplied with oil under high pressure which exerts pressure against each of the pistons, which pressure is referred to the tension nut 21 and the pin 2, the reaction being transmitted through the chambers 20, 18 and 16 and the supporting member 5 to the cover 1. When the pin 2 is thus pre-stressed it is possible to act by means of a pinion 34 on a partial gear 35 so as to rotate the nut 3 until the latter comes into contact with the washer 4. The pressure in the hydraulic circuit is then relieved and the device may be removed by unscrewing the tension nut 21 and lifting the assembly by means of girders 10 and 11. In order to facilitate the return of the pistons to their rest position a low-pressure supply may be provided in the chamber 22c beneath the cover 22.

Figure 2:
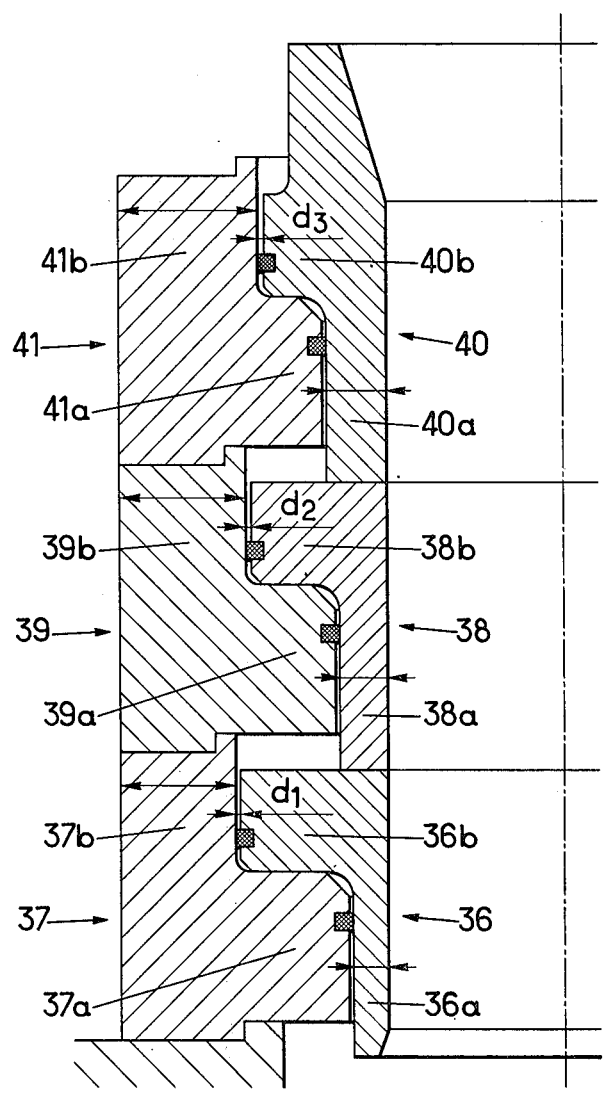
FIG. 2 is a partial sectional view of an enlarged scale showing three stages of a device for stretching bolts or pins in accordance with a second embodiment of the invention.

In the embodiment described on FIG. 1 the thickness of the upper parts 16b, 18b and 20b of the different chambers are all equal. Applicants have, however, found that it is advantageous to also regulate the thickness of the chamber walls in order to obtain deformation substantially equal to those of the different piston skirts, allowing for the fact that the external shape of the chamber is not regular because of the presence of the flat surfaces 43 (FIG. 3). FIG. 2 shows schematically such an embodiment. In this embodiment it will be seen that the lowermost stage consists of a piston 36 and a chamber 37. The intermediate stage comprises a piston 38 and a chamber 39, whereas the upper stage comprises a piston 40 and a chamber 41. The structure of the different pistons 36, 38 and 40 is substantially identical to that of the pistons 15, 17 and 19 shown on FIG. 1. Thus the skirts 36a, 38a and 40a have a thickness which increases from the lowermost stage to the uppermost. As before, it should be noted that the thickness of the lowermost skirt 36a is, in effect, a matter of choice, since it simply serves as a guide. As may be seen on FIG. 2, the upper parts 41b, 39b and 37b of the different chambers, that is to say the parts thereof having the largest diameter, have a thickness which also increases from the lowermost stage to the uppermost stage.

Applicants have found that the lowermost chamber 37 has a tendency, during operation of the device, to dilate in all its dimensions substantially uniformly so that the internal bore of the upper part 37b forming a cylinder practically does not deform at all. On the contrary, the upper part 39b has a tendency, during operation, to undergo irregular deformations resulting in the ovalization of the internal bore acting as a cylinder. This ovalization is even more noticeable in the case of the upper part 41b of the upper chamber 41. The provision of different thicknesses for the three stages makes it possible to reduce these inequalities and deformations and consequently increase the output of the device.

In order to avoid irregular deformations such as ovalization of the upper parts of the chambers or yielding of the skirts of the pistons causing any seizing or interfering with the displacement of the pistons in the chambers, it has also been found that it is advantageous to provide more substantial clearances in the uppermost stage than in the lowermost stage between the respective upper parts of the pistons and the chambers. FIG. 2 shows such an embodiment in which the clearances $d_1$, $d_2$, $d_3$ between the respective upper parts 36b, 38b of the pistons 36, 38 and 40 and the corresponding upper parts 37b, 39b and 41b of the chambers increases from the lowermost stage to the uppermost stage. It should be noted that the clearances at the level of the guide skirts between the various pistons and the corresponding chambers may, on the contrary, be kept equal.

The present invention makes it possible, as has been seen, to substantially increase the output of hydraulic stretchers for pins or bolts, which stretchers have several stages. Thus it is possible to construct a stretching device having three stages, the assembly of the chambers being contained in a parallelepipedic rectangle 315 mm long, 235 mm wide, and 350 mm in height and capable of developing a vertical force of 610 metric tons while utilizing a hydraulic pressure of less than 1400 bars.

What is claimed is:

1. An hydraulic device for an elongated fastener which is to be pre-stressed, said device comprising:
   a. an upper stage comprising:
      an upper portion contacting a traction means mounted on one end of said fastener;
      an upper piston defining a central bore through which a portion of the fastener passes and comprising a first part forming an upper guide skirt and a second part of larger diameter forming an upper head, and
      an upper chamber provided with a shoulder encircling said upper guide skirt;
   b. at least one intermediate stage comprising an intermediate piston defining a central bore through which a portion of the fastener passes and comprising a first part forming an intermediate guide skirt and a second part of larger diameter forming an intermediate head contacting the upper guide skirt of said upper piston, the thickness of said intermediate guide skirt being less than the thickness of said upper guide skirt; and
      an intermediate chamber provided with the shoulder encircling said intermediate guide skirt;
   c. a lower stage comprising a lower piston defining a central bore through which a portion of the fastener passes, and comprising a first part forming a lower guide skirt and a second part of larger diameter forming a lower head, and
      a lower chamber provided with a shoulder encircling said lower guide skirt; and
   d. means for introducing an hydraulic fluid under pressure into said chambers near said shoulders;
   whereby the deformations due to the compressive forces of each piston on the next upper piston and to the radial pressure from the hydraulic fluid of the guide skirts of the various pistons are substantially equalized.

2. An assembly of hydraulic stretching devices according to claim 1 for simultaneously applying tension to a plurality of fasteners positioned at the periphery of a vessel, wherein each chamber of each stretching device has walls comprising two substantially flat external lateral surfaces which are diametrically opposed to each other, each of said surfaces being in contact with at least part of at least one identical surface of a chamber of an adjacent stretching device, and wherein, in each stretching device the wall surrounding each chamber has a thickness which is greater than the wall surrounding the chamber of the next adjacent lower stage, so that the deformations of said chamber walls are substantially equal to those of the different piston skirts.

3. An hydraulic device as claimed in claim 1 in which a clearance exists between the head of each piston and the corresponding portion of each chamber, and the width of said clearance increases from the lowermost stage to the uppermost stage.

4. An hydraulic device as claimed in claim 1 comprising inlet duct means for fluid under pressure for supplying the various stages in series, said inlet duct means being connected to ducts positioned successively longitudinally and transversely of each chamber wall, the lowermost stage being supplied first and the uppermost stage being supplied last, said uppermost stage having an air outlet.

5. An hydraulic device according to claim 4 wherein said ducts comprise a series of vertical and horizontal ducts formed directly in the material of said chambers.

6. An hydraulic device as claimed in claim 1 in which said upper chamber has a wall thickness which is greater than the wall thickness of said intermediate chamber, and said intermediate chamber has a wall thickness which is greater than the wall thickness of said lower chamber.

* * * * *